United States Patent
Park

(10) Patent No.: US 12,498,419 B2
(45) Date of Patent: Dec. 16, 2025

(54) SEMICONDUCTOR TEST APPARATUS USING FPGA AND MEMORY CONTROL METHOD FOR SEMICONDUCTOR TEST

(71) Applicant: YC Corporation, Seongnam-si (KR)

(72) Inventor: Wan Soon Park, Yongin-si (KR)

(73) Assignee: YC Corporation, Gyeonggi-Do (KR)

( * ) Notice: Subject to any disclaimer, the term of this patent is extended or adjusted under 35 U.S.C. 154(b) by 261 days.

(21) Appl. No.: 18/334,078

(22) Filed: Jun. 13, 2023

(65) Prior Publication Data
US 2024/0003964 A1  Jan. 4, 2024

(30) Foreign Application Priority Data
Jul. 4, 2022 (KR) .................. 10-2022-0081741

(51) Int. Cl.
*G01R 31/317* (2006.01)
*G01R 31/3193* (2006.01)

(52) U.S. Cl.
CPC .. *G01R 31/31724* (2013.01); *G01R 31/31935* (2013.01)

(58) Field of Classification Search
CPC .............. G01R 31/31724; G01R 31/31935
See application file for complete search history.

(56) References Cited

U.S. PATENT DOCUMENTS

| 5,946,250 A | * | 8/1999 | Suzuki | G01R 31/31935 365/201 |
| 9,153,345 B2 | * | 10/2015 | Lee | G11C 29/10 |
| 2011/0258491 A1 | * | 10/2011 | Doi | G11C 29/56 714/45 |
| 2011/0276302 A1 | * | 11/2011 | Rivoir | G01R 31/31926 702/117 |
| 2014/0047289 A1 | * | 2/2014 | Lee | G06F 11/2221 714/719 |
| 2021/0160177 A1 | | 5/2021 | Gray | |

FOREIGN PATENT DOCUMENTS

| KR | 20090041528 A | 4/2009 |
| KR | 102408165 B1 | 6/2022 |

OTHER PUBLICATIONS

Korean Office Action dated Sep. 11, 2024 in corresponding Korean Patent Application No. 10-2022-0081741.

* cited by examiner

*Primary Examiner* — Joseph D Torres
(74) *Attorney, Agent, or Firm* — Harness, Dickey & Pierce, P.L.C.

(57) ABSTRACT

A semiconductor test apparatus comprises a failure memory (FM) block configured to store failure data generated from a result of testing a semiconductor device, a buffer memory (BM) block to/in which the failure data stored in the FM block is configured to be copied/stored, and a field programmable gate array (FPGA) configured to perform a first control operation to control the FM block and a second control operation to control the BM block.

20 Claims, 5 Drawing Sheets

SEMICONDUCTOR TEST APPARATUS USING FPGA AND MEMORY CONTROL METHOD FOR SEMICONDUCTOR TEST

CROSS-REFERENCE TO RELATED APPLICATION

This application claims priority from Korean Patent Application No. 10-2022-0081741 filed on Jul. 4, 2022 in the Korean Intellectual Property Office, and all the benefits accruing therefrom under 35 U.S.C. 119, the contents of which in its entirety are herein incorporated by reference.

BACKGROUND

1. Field

The present disclosure relates to a semiconductor test apparatus using a field programmable gate array (FPGA) and a memory control method for a semiconductor test, and more particularly, to a semiconductor test apparatus using an FPGA capable of controlling memories, and a memory control method for a semiconductor test.

2. Description of the Related Art

A semiconductor test apparatus, which is also be referred to as automatic test equipment (ATE), is an apparatus applying electrical pattern signals to semiconductor devices and inspecting the semiconductor device by analyzing responses to the electrical pattern signals from the semiconductor devices.

The semiconductor test apparatus conducts a test on a semiconductor device, sequentially stores failure data, which is generated from the result of the test, in failure memories (FMs), copies the failure data in the FMs to buffer memories (BMs), and analyzes which cells of the semiconductor device are defective by performing redundancy analysis (RA) on the failure data.

In order to meet a capacity requirement from a system and realize a fast write speed during the test of a semiconductor device, the implementation of a considerable number of dynamic random-access memories (DRAMs) for multiple FMs and BMs is needed, and thus, field programmable gate arrays (FPGAs) are generally designed to be able to function as controllers capable of controlling the multiple FMs and BMs. Generally, multiple FPGAs, which are customizable semiconductor devices that are programmable to meet the demands of users, may be installed in a semiconductor test apparatus to control modules with different operations.

However, when implementing memory interface control for each FPGA, there are limits in the number of pins of each FPGA and the number of controllers installed in each FPGA.

Meanwhile, the storage capacity of FMs and BMs is dependent upon the number of input/output (I/O) channels and the storage capacity of a device under test (DUT), which is a semiconductor device to be tested. As the process density of the DUT increases, not only the number of I/O channels increases, but also the required storage capacity of the FMs and the BMs tends to increase.

In order to write failure data at high speed without any delay, the FMs may be configured in an interleaving manner that alternately distributes and stores data between a plurality of external DRAMs. The FMs are generally designed separately from the BMs to be able to be controlled individually to realize the change of the storage ratio of DRAMs for external control and the ranks for interleaving.

However, when the FMs and the BMs are configured as separate FPGAs, the control for a test operation may be difficult in consideration that the level of integration and the speed of DRAMs tend to increase.

Also, when the FMs and the BMs are configured as separate FPGAs, the miniaturization and modulization of a semiconductor chip may be difficult.

Thus, technology is required for designing the FMs and the BMs as a single chip to enable the miniaturization and modulization of a printed circuit board (PCB). Also, a design method is required for facilitating memory control in accordance with increases in the degree of capacity integration and the speed of DRAMs.

SUMMARY

Aspects of the present disclosure provide a semiconductor test apparatus using a field programmable gate array (FPGA) capable of enabling the miniaturization and modulization of a failure memory (FM) and a buffer memory (BM) by integrating the FM and the BM into a single chip.

Aspects of the present disclosure also provide a semiconductor test apparatus using an FPGA capable of maximizing the use of external memories that can be mounted on a single FPGA.

Aspects of the present disclosure also provide a semiconductor test apparatus using an FPGA capable of facilitating the control of an FM and a BM in accordance with increases in the degree of capacity integration and the speed of dynamic random-access memories (DRAMs).

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a semiconductor test apparatus comprising: a failure memory (FM) block storing failure data, which is generated from a result of testing a semiconductor device, a buffer memory (BM) block to/in which the failure data stored in the FM block is copied/stored, and a field programmable gate array (FPGA) performing a first control operation for controlling the FM block and a second control operation for controlling the BM block.

In some embodiments, the semiconductor test apparatus may further comprise: a printed circuit board (PCB) on which the FPGA, the FM block, and the BM block are mounted. In some embodiments, the FPGA may have a Ping Pong PHY IP configuration.

In some embodiments, each of the FM and BM blocks may include first and second memory groups, and each of the first and second memory groups may include main and spare memories, which are mounted in top and bottom areas, respectively, of the PCB.

In some embodiments, the FPGA may control the first and second memory groups at an interval of a predetermined amount of time apart.

In some embodiments, the FPGA may transmit first and second control command signals, which are for controlling the first and second memory groups, respectively, during first and third cycles, respectively, of a dynamic random-access memory (DRAM) clock, among four cycles of the DRAM clock that correspond to a first cycle of a user clock.

In some embodiments, the semiconductor test apparatus may further comprise a control interface transmitting control command signals between the FPGA and the first memory group and between the FPGA and the second memory group.

According to an aspect of the present disclosure, there is provided a memory control method for a semiconductor test, performed by a semiconductor test apparatus, which includes a failure memory (FM) block, a buffer memory (BM) block, and a field programmable gate array (FPGA). The memory control method comprises: storing, by the FM block, failure data, which is generated from a result of testing a semiconductor device, copying the failure data to, and storing the failure data in, the BM block, and performing, by the FPGA, a first control operation for controlling the FM block and a second control operation for controlling the BM block.

In some embodiments, the semiconductor test apparatus may further include a printed circuit board (PCB) on which the FPGA, the FM block, and the BM block are mounted.

In some embodiments, the FPGA may have a Ping Pong PHY IP configuration.

In some embodiments, each of the FM and BM blocks may include first and second memory groups, and each of the first and second memory groups may include main and spare memories, which are mounted in top and bottom areas, respectively, of the PCB.

In some embodiments, the performing the first and second control operations may comprise controlling, by the FPGA, the first and second memory groups at an interval of a predetermined amount of time apart.

In some embodiments, the performing the first and second control operations may comprise transmitting, by the FPGA, first and second control command signals, which are for controlling the first and second memory groups, respectively, during first and third cycles, respectively, of a dynamic random-access memory (DRAM) clock, among the four cycles of the DRAM clock that correspond to a first cycle of a user clock.

In some embodiments, the semiconductor test apparatus may further include a control interface, which transmits control command signals between the FPGA and the first memory group and between the FPGA and the second memory group.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
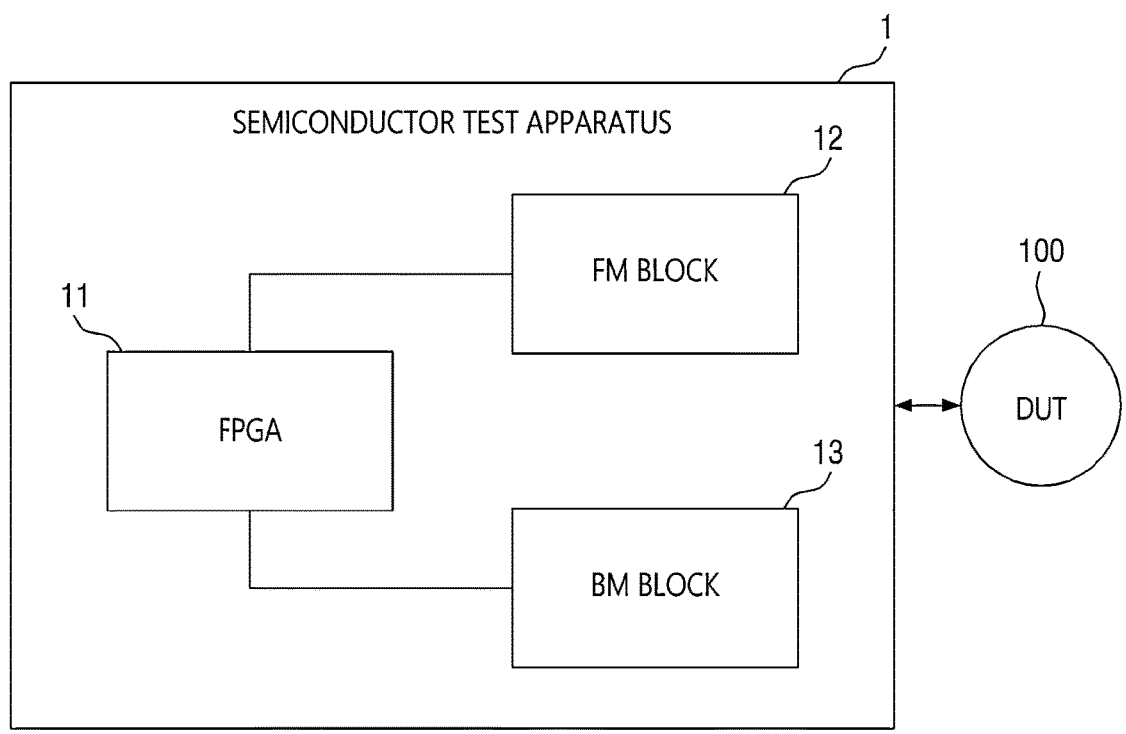
FIG. 1 is a block diagram of a semiconductor test apparatus according to an embodiment of the present disclosure.

Hereinafter, preferred embodiments of the present disclosure will be described with reference to the attached drawings. The advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, some embodiments of the present disclosure will be described in detail with reference to the accompanying drawings.

FIG. 1 is a block diagram of a semiconductor test apparatus according to an embodiment of the present disclosure. Referring to FIG. 1, a semiconductor test apparatus 1 includes a field programmable gate array 11, a failure memory (FM) block 12, and a buffer memory (BM) block 13.

The semiconductor test apparatus 1 may further include an algorithmic pattern generator (not illustrated), a timing generator (not illustrated), and pin electronics (not illustrated) as elements for generating and applying a test signal to a semiconductor device to be tested or a device under test (DUT) 100, and include a test analysis module (not illustrated) as an element for extracting defects from the result of a test conducted on the DUT 100.

Failure data, which is generated from a test result received by applying a test signal to the DUT 100, is stored in the FM block 12. The FM block 12 stores the failure data in an interleaving manner that distributes and stores data between multiple dynamic-random access memories (DRAMs) as alternating patterns to write the failure data at high speed without any delay.

The failure data stored in the FM block 12 is copied to, and stored in, the BM block 13.

The FPGA 11, which is a programmable non-memory semiconductor, may allow the FM block 12 and the BM block 12 to be mounted on the same printed circuit board (PCB) and thus to be integrated into a single chip.

The FPGA 11 may perform a first control operation for controlling the FM block 12 and a second control operation for controlling the BM block 13.

Figure 2:
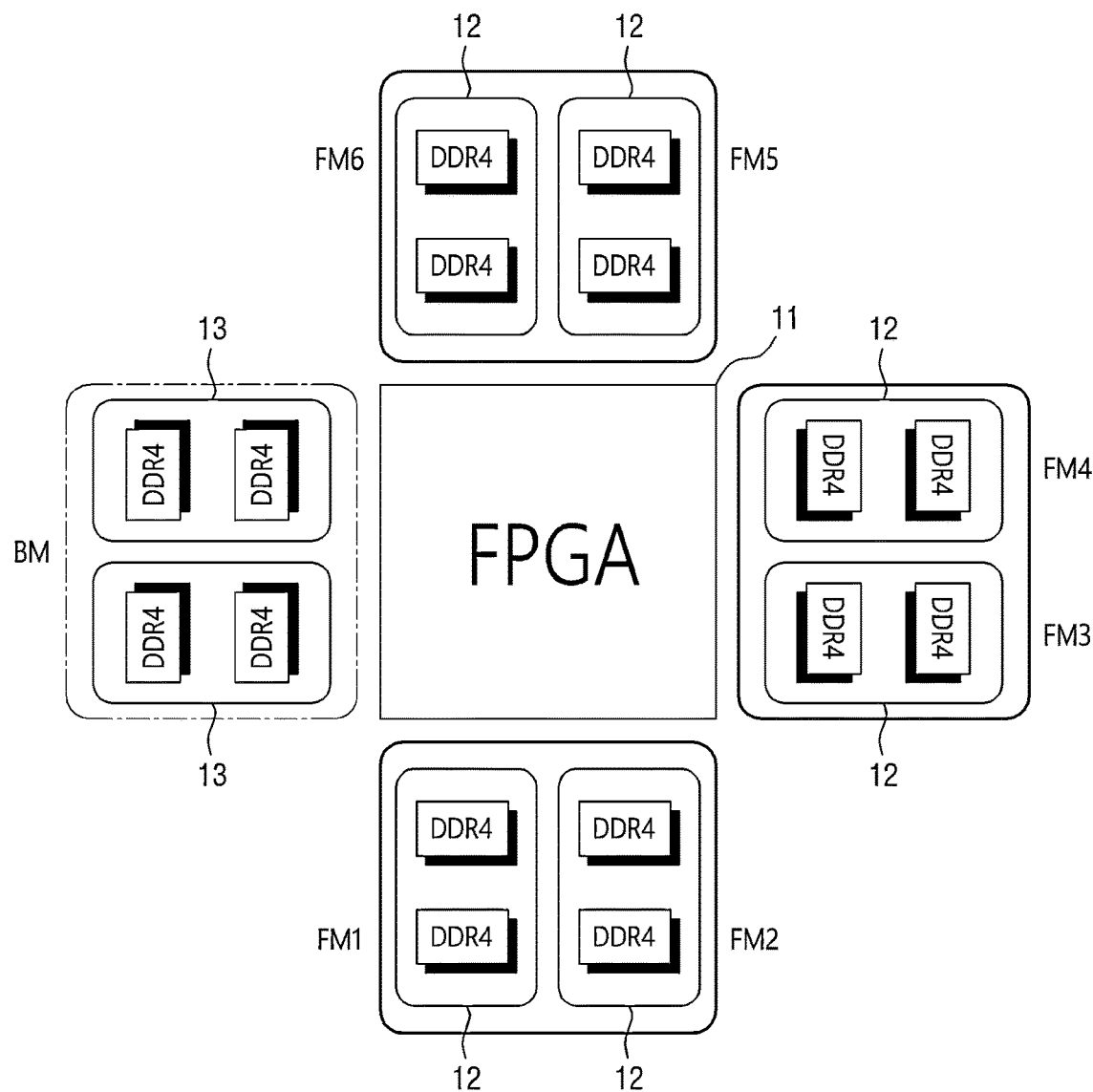
FIG. 2 illustrates an example of how to integrate failure memories (FMs) and buffer memories (BM) using a single FPGA, according to some embodiments of the present disclosure.

For example, referring to FIG. 2, the semiconductor test apparatus 1 may integrate a plurality of FM blocks 12 (i.e., "FM1," "FM2," "FM3," "FM4," "FM5," and "FM6") and a plurality of BM blocks 13 using a single FPGA 11.

As illustrated in FIG. 2, the FPGA 11 may configure the FM blocks 12 and the BM blocks 13, into a single chip and may function as a controller for controlling each of the FM blocks 12 and the BM blocks 13.

The FPGA 11 may have a Ping Pong PHY IP configuration in the physical layer to control each of the FM blocks 12 and the BM blocks 13.

Figure 3:
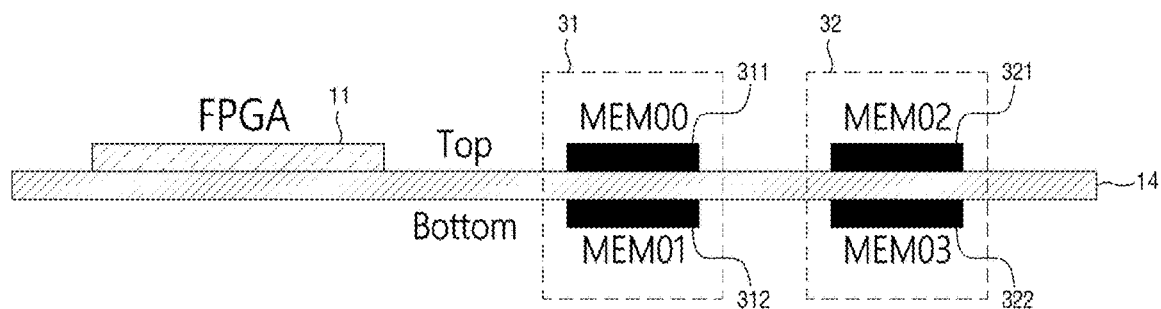
FIG. 3 illustrates a printed circuit board (PCB) on which memory blocks and an FPGA are mounted, according to some embodiments of the present disclosure.

Specifically, referring to FIG. 3, the semiconductor test apparatus 1 may include a plurality of memory blocks, which include first and second memory groups 31 and 32, and a PCB 14, on which the FPGA 11 is mounted. The memory blocks may be FM blocks 12 or BM blocks 13.

The first memory group 31 may include a main memory 311 (i.e., "MEM00"), which is mounted in a top area of the PCB 14, and a spare memory 312 (i.e., "MEM01"), which is mounted in a bottom area of the PCB 14. The second memory group 32 may include a main memory 321 (i.e., "MEM02"), which is mounted in the top area of the PCB 14, and a spare memory 322 (i.e., "MEM03"), which is mounted in the bottom area of the PCB 14.

The FPGA 11 may control the first and second memory groups 31 and 32 at an interval of a predetermined amount of time apart using the Ping Pong PHY IP configuration. For example, when each of the first and second memory groups 31 and 32 is configured as two DRAMs (i.e., a main DRAM and a spare DRAM) mounted in the top and bottom areas of the PCB 14, the FPGA 11 may transmit a control command signal that allocates addresses to the main DRAMs of the first and second memory groups 31 and 32 at an interval of a predetermined amount of time apart to alternately store failure data in the main DRAMs of the first and second memory groups 31 and 32.

Figure 4:
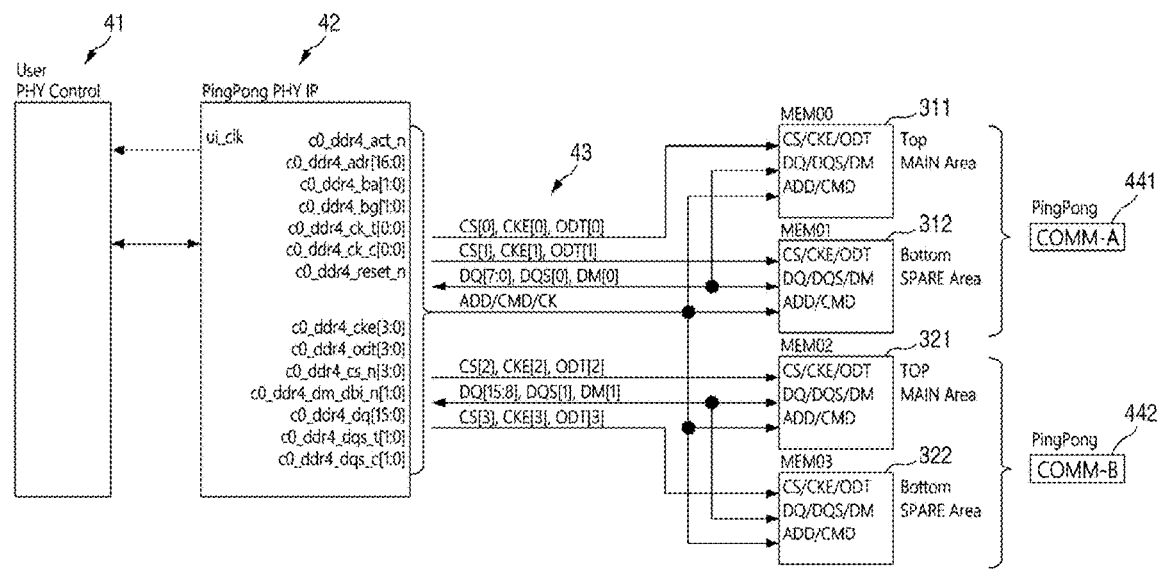
FIG. 4 illustrates an example of how to control first and second memory groups using the Ping Pong PHY IP configuration of an FPGA, according to some embodiments of the present disclosure.

For example, the semiconductor test apparatus 1 may further include a control interface 43 of FIG. 4, which transmits control command signals between the FPGA 11 and the first memory group 31 and between the FPGA 11 and the second memory group 32 to control the first and second memory groups 31 and 32 at an interval of a predetermined amount of time apart using the Ping Pong PHY IP configuration.

For example, referring to FIG. 4, the FPGA 11 may further include a user PHY control block 41 and a Ping Pong PHY IP block 42.

The user PHY control block 41 may transmit an input command for memory control from the user to the Ping Pong PHY IP block 42 and may receive a response signal for the input command.

The Ping Pong PHY IP block 42 may transmit control command signals to the main and spare memories 311 and 312 of the first memory group 31 and the main and spare memories 321 and 322 of the second memory group 32 via the control interface 43 in response to the input command from the user, transmitted by the user PHY control block 41. The main and spare memories 311 and 312 of the first memory group 31 and the main and spare memories 321 and 322 of the second memory group 32 may be implemented as DRAMs.

The Ping Pong PHY IP block 42 may transmit a first command control signal 441 (i.e., "COMM-A") to the first memory group 31 during a first timing period and a second control command signal 442 (i.e., "COMM-B") to the second memory group 32 during a second timing period. There is a gap of time between the first and second timing periods.

The first control command signal 441 may include an address allocation command for storing data in the DRAMs (i.e., the main and spare memories 311 and 312) of the first memory group 31. Similarly, the second control command signal 442 may include an address allocation command for storing data in the DRAMs (i.e., the main and spare memories 321 and 322) of the second memory group 32.

For example, the FPGA 11 may transmit different control commands to the first and second memory groups 31 and 32 using the gap of time between different cycles of a DRAM clock.

Figure 5:
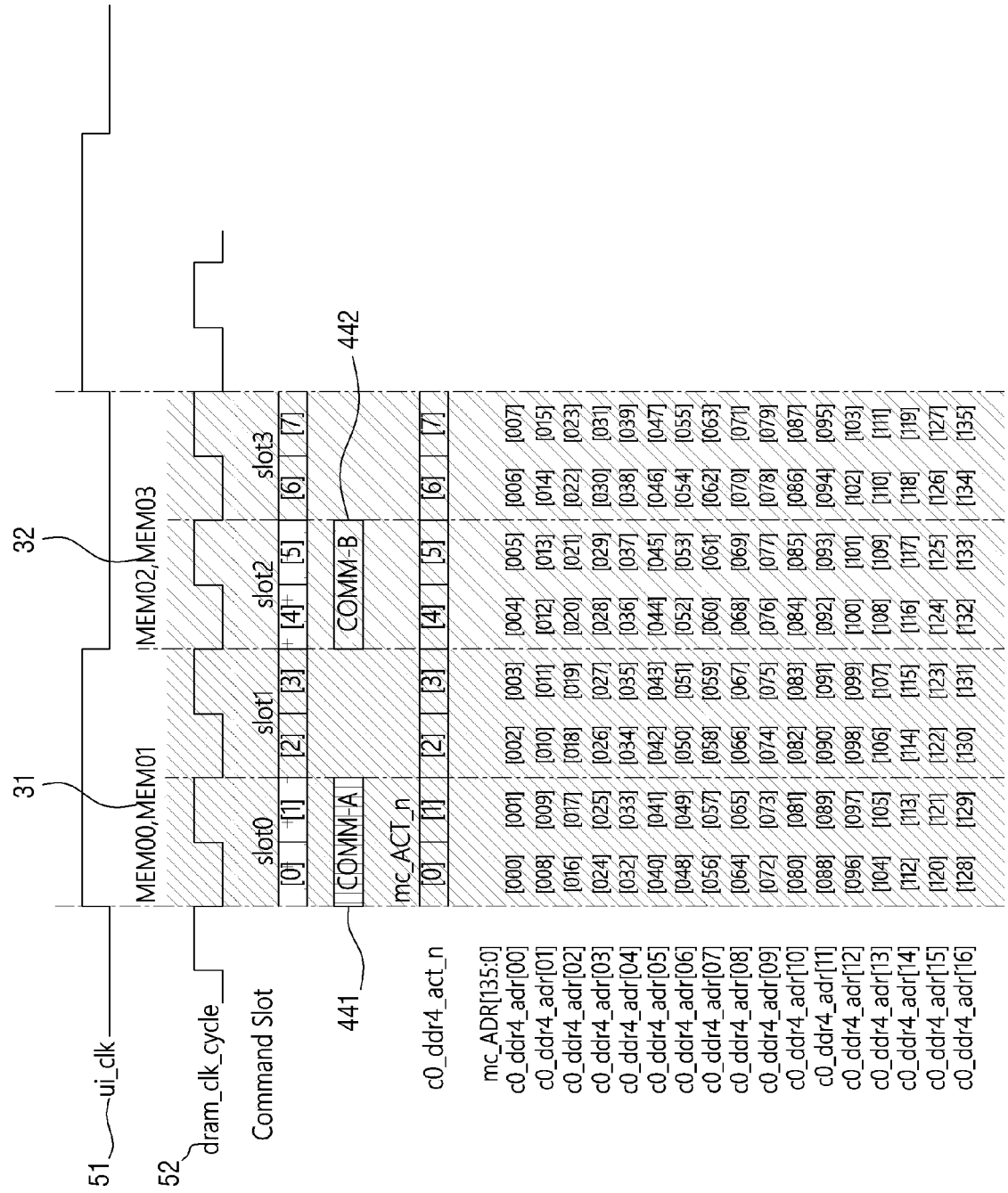
FIG. 5 illustrates an example of how to control the first and second memory groups using the gap of time between different cycles, according to some embodiments of the present disclosure.

For example, referring to FIG. 5, the FPGA 11 may transmit the first and second control command signals 441 and 442, which are for controlling the first and second memory groups 31 and 32, respectively, during first and third cycles, respectively, of a DRAM clock 52, among the four cycles of the DRAM clock 52 that correspond to a first cycle of a user clock 51.

According to the semiconductor test apparatus 1, the miniaturization and modulation of a board can be realized by integrating FMs and BMs for a semiconductor test into a single chip using an FPGA. Also, the use of external memories that can be mounted on an FPGA can be maximized by overcoming the limits of the number of pins for use in an FPGA and the layout of memories around an FPGA.

A memory control method (or operation) for a semiconductor test may be implemented using the semiconductor test apparatus 1, which includes one or more FM blocks, one or more BM blocks, and an FPGA.

For example, the memory control method may include the steps of: storing, by an FM block, failure data, which is generated from the result of testing a semiconductor device; copying the failure data to, and storing the failure data in, a BM block; and performing, by an FPGA, a first control operation for controlling the FM block and a second control operation for controlling the BM block.

The step of performing the first and second control operations, may include controlling, by the FPGA, the first and second memory groups at an interval of a predetermined amount of time apart.

The step of performing the first and second control operations, may also include transmitting, by the FPGA, first and second control command signals, which are for controlling the first and second memory groups, respectively, during first and third cycles, respectively, of a DRAM clock, among the four cycles of the DRAM clock that correspond to a first cycle of a user clock.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A semiconductor test apparatus comprising:
    a failure memory (FM) block configured to store failure data, which is generated from a result of testing a semiconductor device;
    a buffer memory (BM) block to/in which the failure data stored in the FM block is configured to be copied/stored; and
    a field programmable gate array (FPGA) configured to perform a first control operation to control the FM block and a second control operation to control the BM block,
    wherein the FPGA has a Ping Pong PHY IP configuration.

2. The semiconductor test apparatus of claim 1, further comprising:
    a printed circuit board (PCB) on which the FPGA, the FM block, and the BM block are mounted.

3. The semiconductor test apparatus of claim 2, wherein each of the FM and BM blocks includes first and second memory groups, and
    each of the first and second memory groups includes main and spare memories, which are mounted in top and bottom areas, respectively, of the PCB.

4. The semiconductor test apparatus of claim 1, wherein each of the FM and BM blocks includes first and second memory groups, and the FPGA is configured to control the first and second memory groups at an interval of a specific amount of time apart.

5. The semiconductor test apparatus of claim 1, wherein each of the FM and BM blocks includes first and second memory groups, and
    the FPGA is configured to transmit first and second control command signals, which are for controlling the first and second memory groups, respectively, during first and third cycles, respectively, of a dynamic random-access memory (DRAM) clock, among four cycles of the DRAM clock that correspond to a first cycle of a user clock.

6. The semiconductor test apparatus of claim 1, wherein each of the FM and BM blocks includes first and second memory groups, and the semiconductor test apparatus further comprises:
    a control interface configured to transmit control command signals between the FPGA and the first memory group and between the FPGA and the second memory group.

7. The semiconductor test apparatus of claim 1, wherein the BM block is configured to have redundancy analysis performed thereupon.

8. The semiconductor test apparatus of claim 1, wherein the FM block is configured to store the failure data in an interleaving manner.

9. The semiconductor test apparatus of claim 1, wherein the FM block includes Dynamic Random Access Memory (DRAM).

10. A memory control method for a semiconductor test, performed by a semiconductor test apparatus, which includes a failure memory (FM) block, a buffer memory (BM) block, and a field programmable gate array (FPGA), the memory control method comprising:
    storing, by the FM block, failure data, which is generated from a result of testing a semiconductor device;
    copying the failure data to, and storing the failure data in, the BM block; and
    performing, by the FPGA, a first control operation for controlling the FM block and a second control operation for controlling the BM block,
    wherein the FPGA has a Ping Pong PHY IP configuration.

11. The memory control method of claim 10, wherein the semiconductor test apparatus further includes a printed circuit board (PCB) on which the FPGA, the FM block, and the BM block are mounted.

12. The memory control method of claim 11, wherein each of the FM and BM blocks includes first and second memory groups, and
    each of the first and second memory groups includes main and spare memories, which are mounted in top and bottom areas, respectively, of the PCB.

13. The memory control method of claim 11, wherein each of the FM and BM blocks includes first and second memory groups, and
    the performing the first and second control operations, comprises controlling, by the FPGA, the first and second memory groups at an interval of a predetermined amount of time apart.

14. The memory control method of claim 11, wherein each of the FM and BM blocks includes first and second memory groups, and
    the performing the first and second control operations, comprises transmitting, by the FPGA, first and second control command signals, which are for controlling the first and second memory groups, respectively, during first and third cycles, respectively, of a dynamic random-access memory (DRAM) clock, among four cycles of the DRAM clock that correspond to a first cycle of a user clock.

15. The memory control method of claim 11, wherein each of the FM and BM blocks includes first and second memory groups, and
    the semiconductor test apparatus further includes a control interface, which transmits control command signals between the FPGA and the first memory group and between the FPGA and the second memory group.

16. The memory control method of claim 10, further comprising:
    performing a redundancy analysis on the BM block.

17. The memory control method of claim 10, wherein the storing, by the FM block, failure data includes storing the failure data in an interleaving manner.

18. A semiconductor test apparatus comprising:
    a failure memory (FM) block configured to store failure data, which is generated from a result of testing a semiconductor device;
    a buffer memory (BM) block to/in which the failure data stored in the FM block is configured to be copied/stored;

a field programmable gate array (FPGA) configured to perform a first control operation to control the FM block and a second control operation to control the BM block; and a printed circuit board (PCB) on which the FPGA, the FM block, and the BM block are mounted, wherein each of the FM and BM blocks includes first and second memory groups, and each of the first and second memory groups includes main and spare memories, which are mounted in top and bottom areas, respectively, of the PCB.

19. The semiconductor test apparatus of claim 18, wherein each of the FM and BM blocks includes first and second memory groups, and each of the first and second memory groups includes main and spare memories, which are mounted in top and bottom areas, respectively, of the PCB.

20. The semiconductor test apparatus of claim 18, wherein each of the FM and BM blocks includes first and second memory groups, and each of the first and second memory groups includes main and spare memories, which are mounted in top and bottom areas, respectively, of the PCB.

* * * * *